United States Patent [19]
Schild

[11] Patent Number: 5,676,639
[45] Date of Patent: Oct. 14, 1997

[54] ADJUSTABLE PRESSURE RELIEF VALVE FOR COMPRESSION GARMENT

[75] Inventor: Rolf Schild, London, England

[73] Assignee: Huntleigh Technology plc., Luton, United Kingdom

[21] Appl. No.: 475,462

[22] Filed: Jun. 7, 1995

Related U.S. Application Data

[63] Continuation of Ser. No. 209,824, Mar. 11, 1994, abandoned.

[30] Foreign Application Priority Data

Mar. 12, 1993 [GB] United Kingdom ............. 9305166

[51] Int. Cl.⁶ .................................................. A61H 7/00
[52] U.S. Cl. .................................. 601/151; 601/148
[58] Field of Search ..................... 601/148–151; 5/448, 449, 453

[56] References Cited

U.S. PATENT DOCUMENTS

| | | | |
|---|---|---|---|
| 2,245,909 | 6/1941 | Enfiajian . | |
| 3,063,444 | 11/1962 | Jobst . | |
| 3,465,749 | 9/1969 | Moreland et al. . | |
| 3,811,431 | 5/1974 | Apstein | 128/64 |
| 3,896,794 | 7/1975 | McGrath | 128/24 |
| 4,013,069 | 3/1977 | Hasty | 128/24 |
| 4,029,087 | 6/1977 | Dye et al. | 128/24 |
| 4,030,488 | 6/1977 | Hasty | 128/24 |
| 4,370,975 | 2/1983 | Wright | 601/152 |
| 4,391,009 | 7/1983 | Schild et al. | 5/453 |
| 4,396,010 | 8/1983 | Arkans | 128/24 |
| 4,577,626 | 3/1986 | Marukawa et al. | 128/64 |
| 4,747,398 | 5/1988 | Wright | 601/152 |
| 4,867,140 | 9/1989 | Hovis et al. | 601/152 |
| 5,007,411 | 4/1991 | Dye | 128/64 |
| 5,044,029 | 9/1991 | Vrzalik | 5/453 |
| 5,109,561 | 5/1992 | Schild | 5/453 |
| 5,117,518 | 6/1992 | Schild | 5/453 |
| 5,142,719 | 9/1992 | Vrzalik | 5/609 |
| 5,152,021 | 10/1992 | Vrzalik | 5/455 |
| 5,189,742 | 3/1993 | Schild | 5/453 |

FOREIGN PATENT DOCUMENTS

| | | | |
|---|---|---|---|
| 1118740 | 7/1968 | United Kingdom . | |
| 2077393 | 12/1981 | United Kingdom | 601/148 |
| 8908438 | 9/1989 | WIPO . | |
| 9200715 | 1/1992 | WIPO . | |

*Primary Examiner*—Robert A. Hafer
*Assistant Examiner*—Brian E. Hanlon
*Attorney, Agent, or Firm*—Fitzpatrick, Cella, Harper & Scinto

[57] ABSTRACT

An adjustable pressure relief valve has a movable valve closure member with a spring applying a closing force. An adjuster can set the size of this closing force. Pressure responsive means applies an opening force corresponding to a fluid pressure. This pressure responsive means includes a plurality of pressure sensors which can be respectively connected to one or more sources of fluid pressure. Each of these sensors is adapted to apply an opening force to the closure member which has a respective different relationship to the pressure of the source connected thereto. The relief valve opens when the opening force matches the closing force applied by the spring. The different pressure sensors allow the valve to open in response to any one of a range of different pressures.

16 Claims, 2 Drawing Sheets

1

ADJUSTABLE PRESSURE RELIEF VALVE FOR COMPRESSION GARMENT

This application is a continuation of application Ser. No. 08/209,824 filed Mar. 11, 1994 now abandoned.

BACKGROUND OF THE INVENTION

The present invention is concerned with an adjustable pressure relief valve.

Pressure relief valves are known which comprise a moveable valve closure member urged, eg by a spring, to a position closing the relief valve. For example, the closure member may be in the form of a strip pivoted at one end which is urged to bring a valve seal at the other end of the strip against a valve seat, thereby closing the valve. Adjustment means is provided to set the magnitude of the closing force. This may take the form of a screw threaded bolt which is turned to increase the compression of a compression spring applying the closing force to the closure member. To operate as a pressure relief valve, the valve includes pressure responsive means arranged to apply an opening force corresponding to a fluid pressure to urge the closure member in opposition to the closing force towards an open position. Then if the fluid pressure is sufficient so that the opening force exceeds the closing force, the valve opens to relieve the pressure. Typically the pressure responsive means takes the form of an inflatable sac located between a support surface and the closure member so that, on inflation, the sac applies the opening force to the closure member.

Pressure relief valves of the above kind have been used for controlling the maximum pressure achieved when inflating an inflatable garment, for example. Then if the inflatable garment is connected to the sensor sac of the pressure relief valve, and the inflation source, eg a pump is connected both to the garment to be inflated and to the relief valve, when the garment reaches a certain pressure, the sensor sac of the relief valve opens the valve so that fluid from the pressure source can escape and thereby limit the pressure level in the garment. Pressure relief valves of this kind can also be used for controlling the pressure in alternating pressure mattresses used for the relief of bed sores and a typical application is described in WO89/08438.

Pressure garments are also known which are divided up into two or more chambers which can be kept at different pressures at different times. Such garments are used to apply differential pressures to different pares of the limb of a patient. Garments of this kind are disclosed in U.S. Pat. Nos. 4,013,069, 4,370,975 and WO92/00715. In the latter case, only a single fluid supply is required and a pressure differential is maintained between the chambers of the garment by providing restricted fluid flow from one chamber of the garment to the next, in combination with a restricted bleed of fluid to atmosphere from the last chamber. However, in the arrangements of the other two patent specifications, separate fluid supplies are provided to each chamber of the garment. In particular in U.S. Pat. No. 4,370,975, the pressure in each chamber of the garment is individually controlled by respective pressure regulators which can each be adjusted as required. However, this leads to excessive complication and also expense since a number of individually controllable pressure regulators are required. Also setting up the required pressures for the different chambers of the garment can be difficult and prone to error.

An attempt to overcome this difficulty is described in U.S. Pat. No. 4,747,398 in which three separate pressure regulators are "ganged" together by means of chain drives so that they can all be adjusted simultaneously from a single control knob. This arrangement is not only mechanically complicated and bulky, but also the resultant simultaneous pressure control may not be of the form desired for compression garments of this kind.

The present invention sets out to provide a simplified arrangement for the pressure control of a multi-chamber compression garment whereby different pressures can be achieved in the different chambers of the garment.

In addition, the present invention is applicable where multiple differential pressure control is required in any other technical field.

SUMMARY OF THE INVENTION

According to present invention, an adjustable pressure relief valve comprises a movable valve closure member, urging means applying a closing force urging the closure member to a position closing the relief value, adjustment means to set the magnitude of said closing force, and pressure responsive means which applies an opening force corresponding to a fluid pressure to urge the closure member in opposition to said closing force towards an open position, wherein said pressure responsive means includes a plurality of pressure sensors for respective connection to one or more sources of fluid pressure, each said sensor being adapted for applying an opening force to the closure member which has a respective relationship to the pressure of the source connected thereto.

With this arrangement, the relief valve is opened whenever the fluid pressure applied to a respective one of the pressure sensors is sufficient for the sensor to overcome the closing force applied to the closure member of the valve. Since each sensor is adapted for applying an opening force which has a respective relationship to the pressure supplied thereto, the pressure which must be applied to one sensor to open the relief valve may be different to the pressure which must be applied to another sensor to open the valve.

As mentioned previously, the relief valve of the present invention may be used in particular for controlling the pressures of a multi-chamber limb compression apparatus. Accordingly, the invention then invisages apparatus for applying compression to a limb of a patient comprising a plurality of inflatable means to envelope respective regions of a limb, a source of inflation fluid, means to direct fluid from the source sequentially to inflate the respective inflatable means one at a time, and an adjustable pressure relief valve as described above connected to limit the fluid pressure from said source, wherein said pressure sensors of the relief valve are arranged to be connected to respective said inflatable means at least when the respective inflatable means is being inflated from said source, whereby the pressure reached on inflation of each of the inflatable means when the relief valve opens has a respective relationship to the magnitude of said closing force set by the adjustment means.

The implication of this arrangement is that the maximum pressure of a particular chamber, associated with a respective one of the pressure sensors of the relief valve will tend to be a predetermined constant factor of the closing force set by the adjustment means of the valve. The maximum pressures for different chambers can thus be different predetermined factors of this closing force. As a result, adjustment of the adjusting means, to alter the closing force on the closure member of the relief valve, adjusts all the maximum pressures simultaneously whilst keeping them substantially in the same proportion with each other and, as will be explained later herein, this manner of simultaneously adjusting the maximum pressures in the chambers of a multi-chamber compression garment is extremely advantageous. In the above described arrangement of this invention, this advantageous pressure control is achieved in a compact and simple manner.

In the pressure relief valve, at least some of said plurality of pressure sensors may be arranged for applying respective said opening forces to the closure member additively. This means that the opening force applied by one sensor may be added to an opening force being applied by another sensor so that the total opening force on the closing member is the sum of the two.

However, at least some of said plurality of pressure sensors may be arranged for applying said opening forces mutually exclusively. Then, said pressure sensors may be arranged so that only the respective opening force of highest magnitude is applied to the closure member, eg when more than one of the pressure sensors are connected simultaneously to one or more sources of fluid pressure.

Conveniently, the pressure relief valve may include a support surface and said pressure sensors may comprise respective inflatable sensor sacs stacked one on top of the other between the support surface and the closure member. Then the dimensions of each sensor sac may be selected so that the respective sac applies, when inflated, an opening forced to the closure member having a respective predetermined relationship to the pressure of the source connected thereto.

In one arrangement, the dimensions of each sac are selected for the respective sac to apply said predetermined closing force when the other sacs are deflated. Alternatively, the dimensions of each sac may be selected for the respective sac to apply said predetermined closing force when at least one of the other sacs is partially inflated.

BRIEF DESCRIPTION OF DRAWINGS

Examples of the present invention will now be described with reference to the accompanying drawings in which.

DETAILED DESCRIPTION OF THE PREFERRED EMBODIMENTS

Figure 1:
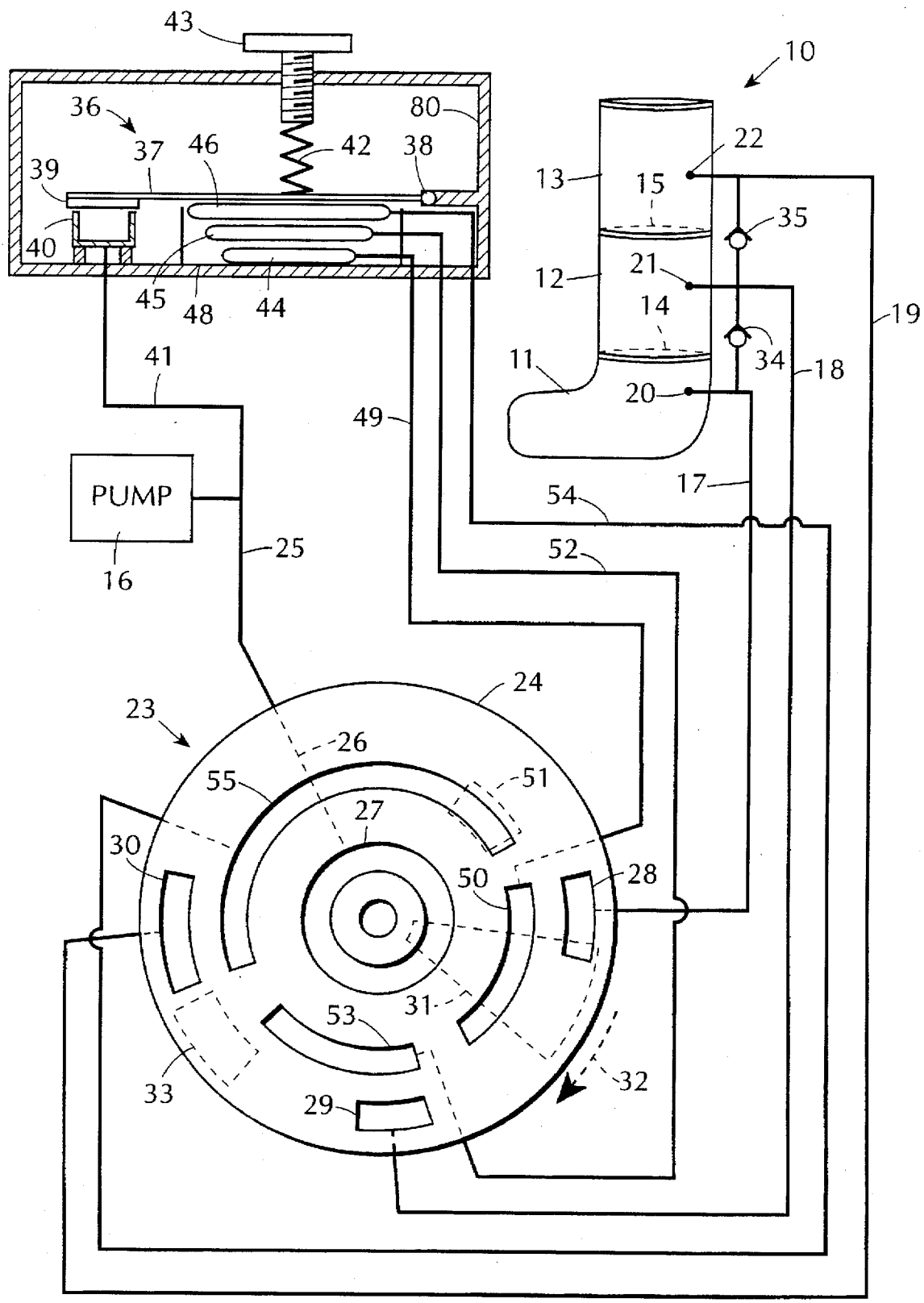
FIG. 1 is a schematic illustration of one embodiment of the invention comprising an adjustable pressure relief valve connected to control the maximum pressures in the chambers of a multi-chamber inflatable compression garment.

Referring to FIG. 1, an intermittent compression garment is shown schematically at 10. The illustrated garment takes the form of a boot to fit over the leg of a patient. The boot is made with two superimposed layers of gas impervious material so that inflation of the chambers between the two layers has the effect of applying pressure to the foot and leg of the wearer.

As shown, the illustrated boot 10 comprises three separately inflatable chambers, 11, 12 and 13. These chambers may be made in the same manner as the inflatable compression garment described in WO92/00715. Adjacent chambers of the boot 10 are separated by a diaphragm or web, 14, 15, so that the inner and outer layers forming the inflatable boot 10 are not directly sealed together to form the adjacent chambers 11, 12 and 13. 2n the boot 10, there are no flow passages interconnecting adjacent chambers 11 and 12 or 12 and 13.

The chambers 11, 12 and 13 of the boot 10 are inflated with air supplied from an air pump 16 along pipes 17, 18 and 19 connected to the chambers at respective ports 20, 21 and 22.

Air from the pump 16 is directed to the pipes 17, 18 and 19 by means of a rotary valve assembly 23. The rotary valve 23 is shown greatly enlarged in the diagram for clarity. The valve 23 comprises a stator 24 operating in co-operation with a rotor. Generally, the adjacent faces of the stator and rotor are accurately machined so that a flat region of the face of the rotor can seal a port formed in the adjacent face of the stator, as the rotor is rotated relative to the stator. In this way, cyclic switching of the air supply can be obtained by continuously driving the rotor from a motor (not shown) if the co-operating face of the rotor is provided with a communicating channel to interlink ports formed in the face of the stator. Rotary valves of this kind for cyclic operation are known in the art.

In the rotary valve 23 shown in FIG. 1, a pipe 25 from the pump 16 is connected to the stator 24. An internal conduit 26 within the thickness of the stator disk 24 supplies compressed air from the pipe 25 to an annular channel 27 near the centre of the stator. The annular channel 27 is open to the co-operating face of the rotor. Similarly, the pipes 17, 18 and 19 to the respective chambers of the boot 10 are connected to the stator 24 and communicate with respective ports 28, 29 and 30 which are also open to the co-operating rotor face. The ports 28, 29 and 30 are distributed around the stator on a common circumference which, in the illustrated example, is towards the cater periphery of the rotor disk. The face of the rotor co-operating with the stator 24 includes a radially extending open port 31. When the port 31 overlies one of the ports 28, 29 and 30 compressed air from the pump 16 is connected from the annular channel 27 to the respective port 28, 29, 30 and sent to the respective chamber of the boot 10 to inflate the chamber. It can be seen that, as the rotor rotates relative to the stator 24 in the direction of arrow 32, the supply of compressed air is connected in sequence to inflate chamber 11, via port 28, then chamber 12 via port 29 and finally chamber 13 via port 30.

When continued rotation of the rotor moves the channel 31 past the respective port 28, 29, 30 to disconnect the port from the pump 16, the port 28, 29, 30 is effectively sealed by the rotor, closing off the respective chamber of the boot which is maintained at the pressure reached during inflation.

The chambers of the boot are successively deflated after each inflation cycle when continued rotation of the rotor brings a port 33, extending right through the rotor disk to atmosphere, into registration with each of the ports 28, 29 and 30. In the arrangement illustrated in FIG. 1, when the open pore 33 first registers with the port 28, air from the lower chamber 11 is able to escape to atmosphere through the port 33 in the rotor. Oneway valves 34 and 35 are illustrated inter-connecting adjacent chambers of the boot 10. The valve 34 between chambers 11 and 12 prevents air flowing from the lower chamber 11 to the upper chamber 12 but permits air to flow from the upper chamber to the lower chamber if the pressure in the lower chamber falls below that in the upper chamber. Similarly valve 35 permits the topmost chamber 13 to exhaust once the pressure in the middle chamber 12 falls below the pressure in the upper chamber. Accordingly, all three chambers of the boot 10 in fact deflate simultaneously as soon as the open port 33 in the rotor registers with port 28 of the stator connected to the lower chamber 11.

The pressure reached in the chambers 11, 12 and 13 of the boot 10 is controlled by an adjustable pressure relief valve illustrated generally at 36. The pressure relief valve 36 comprises a strip or flap 37 pivoted from the body 80 of the valve at one end at 38. The other end of the flap 37 has the seal 39 co-operating with a valve seat 40, so that the relief valve is closed when the flap 37 brings the seal 39 into contact with the seal 40. The valve is connected by a pipe 41 to the outlet of the pump 16 so as to control the maximum pressure of air at the pump outlet by opening to allow air from the pump to escape to atmosphere.

The flap 37 is urged into the closed position by a spring 42, the compression of which can be set by an adjusting knob 43. The flap 37 of the valve is opened by an opening force applied in opposition to the spring 42 by one or more of three inflatable bladders or sensor sacs 44, 45 and 46. The sensor sacs, 44, 45 and 46 are located beneath the flap 37 between the flap and a support surface 48.

One of the bladders 44 is connected by means of a pipe 49 to an open port 50 in the stator 24 of the rotary valve 23. The port 50 is located on a circumference radially inwards of the port 28 but extends over the full sector of he port 28 so that radial port 31 of the rotor communicates simultaneously with ports 28 and 50. As a result, the bladder 44 is connected to the outlet of the pump 16 when the pump 16 is connected via the port 28, to the lower chamber 11 of the boot. In this way, it can be seen that the pressure reached during inflation of the lower chamber 11 is dependent on the characteristics of the bladder 44, that is the pressure in the bladder 44 which is sufficient to provide an opening force on the flap 37 which counteracts the closing force of the compression spring 42.

On further rotation of the rotor in the direction of arrow 32, the port 28 becomes sealed off by the rotor so as to maintain the air pressure in the lower chamber 11 of the boot. However, the port 50 extends circumferentially beyond the port 28 in the direction of rotation so that, after the lower chamber 11 is sealed off, the bladder 44 remains connected to the outlet of the pump to provide pressure relief. Further rotation of the rotor brings an additional open port 51 in the rotor into communication also with the channel 50 in the stator so that both the pump 16 and also the bladder 44 are now connected to exhaust.

Continued rotation of the rotor brings the radial channel 31 of the rotor into communication with port 29 of the stator connected to the intermediate chamber 12 of the boot. The second bladder 45 of the pressure relief valve is connected by means of a pipe 52 to a further port 53 in the stator in the same circumference as the port 50. Port 53 also extends over the full sector of port 29 and further in the direction of rotation of the rotor.

When the radial channel 31 of the rotor first communicates with ports 29 and 53 of the stator, it is still also in communication with port 50 and thence to atmosphere via open port 51 in the rotor.

However, a small further rotation of the rotor disconnects the radial channel 31 from channel 50 of the stator so that the pump 16 is connected only via port 29 to the intermediate chamber 12 of the boot and via port 53 to the bladder 45 of the relief valve. Inflation of the intermediate chamber 12 can now proceed to a pressure determined by the bladder 45. Bladder 44 is at this time connected to exhaust via open port 51. The bladder 45 may be selected so as to provide a greater opening force on the valve flap 37 for the same pump pressure, so that the relief valve in fact now opens at a lower pressure than during inflation of the lower-most chamber 11 of the boot.

As before, continued rotation of the rotor disconnects the radial channel 31 from port 29 and seals off the port to maintain the pressure in the chamber 12. Meanwhile, the pump remains connected to the bladder 45 and both are then connected to the exhaust when the open port 51 interconnects with channel 53.

The bladder 46 is in turn connected by a pipe 54 to a further port 55 in the stator on the same circumference as ports 50 and 53. The port 55 extends over the same sector as port 30 connected to the upper chamber 13 of the boot.

Once again, continued rotation of the rotor firstly brings the pump into communication with ports 30 and 55 whilst still in communication with port 53, but then communication with port 53 is closed so that inflation of the uppermost chamber 13 can start. The pressure reached by the uppermost chamber is then controlled by the bladder 46 which may be arranged to limit the inflation pressure at a lower pressure than the intermediate chamber 12 and the lowermost chamber 11. When continued rotation of the rotor disconnects the radial chamber 31 from the port 30, the uppermost chamber remains sealed off to hold its pressure.

The port 55 extends in the direction of rotation beyond the port 30 so that the pump 16 remains connected to the bladder 46 and in due course to exhaust via the open port 51. In this way, the outlet pressure of the pump 16 is controlled during the maintenance and deflation parts of the compression cycle until the radial channel 31 again communicates with ports 28 and 50 to reinflate the lowermost chamber 11 of the boot.

The open port 33 through the rotor is located to come into communication with the port 28 to initiate deflation of the boot a period of time after inflation of the uppermost chamber 13 has been completed.

With the arrangement described with reference to this figure of the drawings, each of the bladders, or sensor sacs 44, 45 and 46 of the pressure relief valve, is connected to the outlet of the pump only when its respective boot chamber is being inflated. Before inflation of the next chamber of the boot begins, the sensor sac for the last chamber is deflated. In this way, only one of the sensor sacs is operational at any time. The opening force applied to the flap 37 of the relief valve is dependent on both the air pressure within the respective sac and the effective diameter of the sac. Accordingly, the larger the diameter of the sac the lower is the pressure within the sac required to apply the same opening force. By selecting the diameters of the sacs 44, 45 and 46, the relationship between the pressures reached in the chamber of the boot can be predetermined.

Importantly, the pressures reached by the chambers of the boot can all be adjusted by the one control knob 43 which sets the closing force applied to the valve flap 37. It can be seen that the ratio between the pressures reached in the chambers of the boot is not substantially altered when adjusting the maximum pressure in the lowermost chamber 11 of the boot. Thus, if the sacs 44, 45 and 46 are selected so that an upper limit pressure of 90 mm Hg for the lower chamber 11 corresponds to a pressure of 70 mm Hg for the middle chamber 12, and a pressure of 50 mm Hg for the upper chamber 13, adjusting the pressure of the lowermost chamber by means of the knob 43 to 45 mm Hg automatically resets the other two pressures to 35 mm Hg and 25 mm Hg, respectively. The pressure ratios are maintained. This is highly desirable for differential or graduated pressure garments of this kind.

Figure 2:
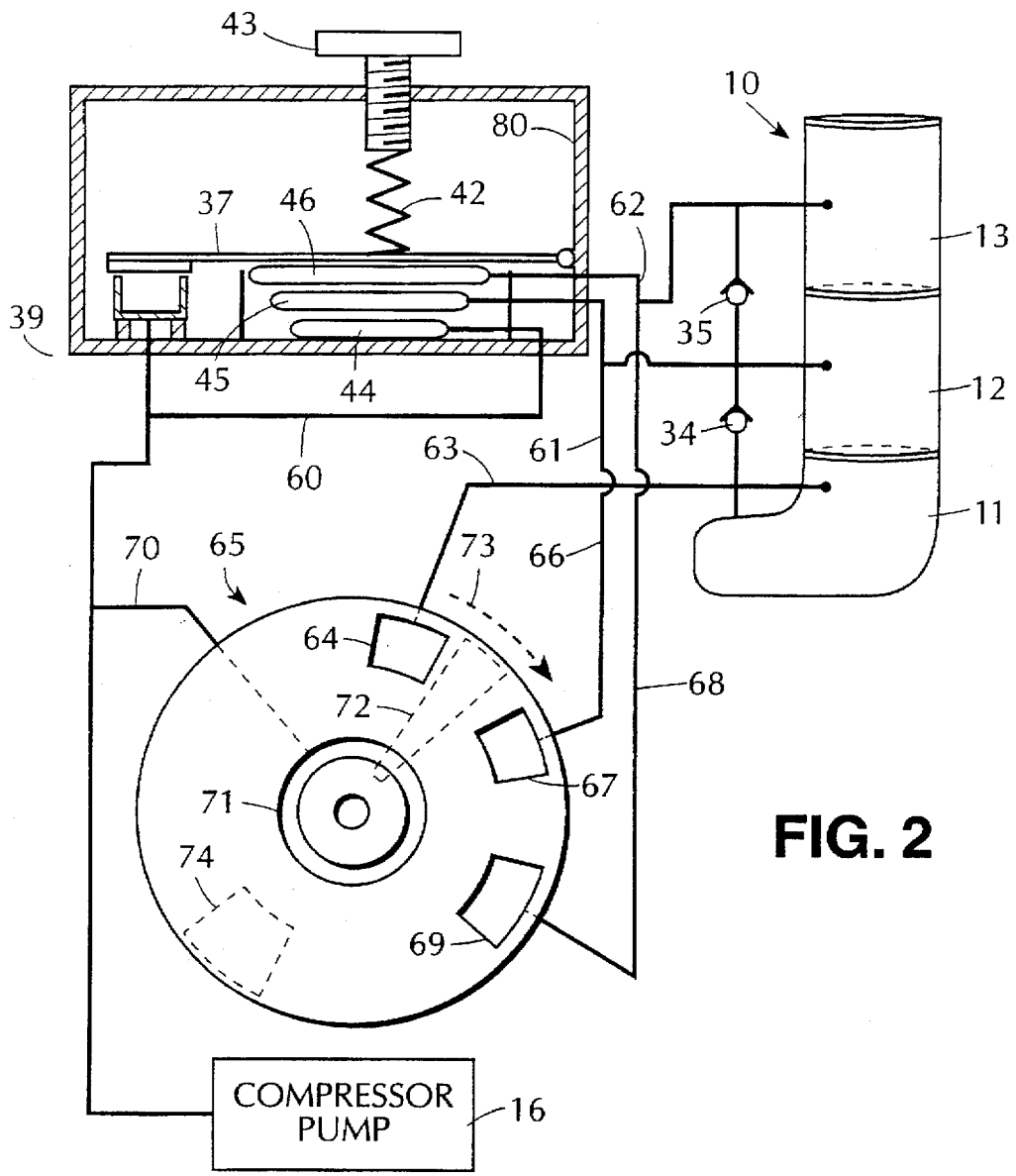
FIG. 2 is a schematic illustration of a modified version of the embodiment of FIG. 1.

In the modified embodiment illustrated in FIG. 2, similar components to those illustrated in FIG. 1 are given the same reference numerals. In this embodiment, the lower sensor sac, or bladder 44, is connected by means of pipe 60 directly to the outlet of the compressor pump 16 which is also connected as before to the relief valve to allow excess air to escape to atmosphere. The bladder 45 is connected by means of a pipe 61 directly to the intermediate chamber 12 of the boot 10, and bladder 46 is connected by a pipe 62 directly to the upper chamber 13 of the boot. The lower chamber 11 of the boot is connected by a pipe 63 to a first port 64 in the stator of a rotary valve 65. Intermediate chamber 12 is connected by a pipe 66 to a second port 67 in the stator, and upper chamber 13 is connected by pipe 68 to a third port 69. The ports 64, 67 and 69 in the stator are arranged around a common circumference. The compressor pump is connected by pipe 70 also to the stator to an annular channel 71 similar to the channel 27 in the rotary valve of the embodiment of FIG. 1.

The rotor of the rotary valve 65 has a radially extending port shown in ghost outline at 72. As the rotor of the valve rotates in the direction of an arrow 73, the radial port 72 first interconnects the annual channel 71 with the port 64, so that the output of the pump 16 begins to inflate the lower chamber 11. The pressure achieved on inflation of the lower chamber 11 is controlled by the bladder 44.

Once the radial port 72 passes the port 64, the lower chamber 11 is sealed off. On further rotation of the rotor, the radial port 72 communicates with port 67. There is immediate loss of pressure in the supply line 70 and the bladder 44 as air flows into the intermediate chamber 12 of the boot 10. Continued operation of the pump inflates chamber 12 up to a pressure controlled by simultaneous inflation of both bladders 44 and 45. The dimensions of bladders 44 and 45 are selected so that the pressure from the outlet of the pump which is sufficient to cause the bladders 44 and 45 to move the valve flap 37 to open the valve, is less than the pressure required previously on inflating lower chamber 11 for bladder 44 on its own to open the relief valve.

On further rotation of the rotor of the rotary valve, chamber 12 also becomes sealed off and subsequently the outlet of the compressor pump 16 is connected via port 69 to begin inflation of the uppermost chamber 13. Again, there is an initial drop in pressure at the outlet of the pump until continued supply of air from the pump inflates chamber 13. During this final phase of inflation of the upper chamber 13, both bladders 44 and 46 are inflated to the pressure reached by the upper chamber 13. At the same time, bladder 45 remains connected to the intermediate chamber 12 and so retains the pressure of the intermediate chamber. Bladder 46 is dimensioned so that the final pressure reached in the upper chamber 13 is again less than the pressure in the intermediate chamber 12. This pressure reached by the upper chamber 13 is controlled by partial inflation of the bladder 45 at the pressure of chamber 12, in combination with partial inflation of both bladders 44 and 46 at the pressure of chamber 13.

On continued rotation of the rotor of the rotary valve 65, upper chamber 13 is also sealed off and inflation of the boot is maintained until an open exhaust port 74 extending through the rotor of the valve comes into register with port 64, whereupon the lowermost chamber 11 of the boot is immediately evacuated. As in the preceding embodiment, non-return valves 34 and 35 may be provided so that chambers 12 and 13 of the boot also lose pressure on deflation of the lower chamber 11. In any case, continued rotation of the rotor of the valve 65 causes the exhaust port 74 to register successively with ports 67 and 69 to ensure complete deflation of all chambers of the boot prior to the next inflation cycle.

It has been found that appropriate selection of the dimensions of the bladders 44, 45 and 46 in this embodiment permit the pressures achieved in the different chambers of the boot 10 to be controlled as required and maintained as a substantially constant ratio for different pressure settings of the lower chamber 11 under the control of the knob 43.

Figure 3A:
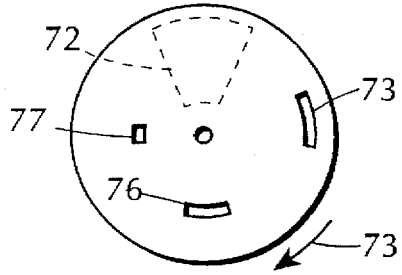
FIGS. 3a and 3b illustrate the rotor and stator respectively of a modified form of rotary valve for use with the embodiment of FIG. 2.
Figure 3B:
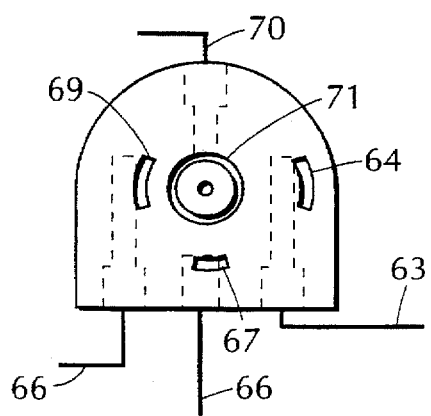

FIG. 3a and 3b illustrate the rotor and stator, respectively, of a modified form of rotary valve for use with the embodiment of FIG. 2. In this embodiment, the ports 64, 67 and 69 in the stator are provided at different radii from the axis of the rotary valve, rather than on a common circumference as in FIG. 2. The radial port 72 of the rotor communicates with each of port 64, 67 and 69 successively in the same way as for the FIG. 2 embodiment. However, the rotor of FIG. 3A is provided with three open exhaust ports 75, 76 and 77 which registers simultaneously with the ports 64, 67 and 69 of the stator to deflate all three chambers of the boot simultaneously at the end of an inflation cycle.

With this arrangement, the non-return valves 34 and 35 of FIG. 2 are not required to assist deflation of the boot, but may nevertheless be desirable for safety purposes to ensure that accidental blockage of one of the air pipes cannot cause an upper chamber of the boot to be at a higher pressure than a lower chamber.

In a further modification, the non-return valves 34 and 35 may be dispensed even without the simultaneous deflation provided by the rotary valve design of FIGS. 3a and 3b. As described previously, the chambers of the boot are divided by membranes 14 and 15 interconnecting the inner and outer impervious sheets of the garment. On inflation of chamber 11, for example, to a higher pressure than chamber 12, membrane 14 tends to deflect upwards as illustrated in the drawing of FIG. 1. Similarly, the membrane 15 separating chambers 12 and 13 also deflects upwards because of the lower pressure in upper chamber 13. On deflation, if only the lowermost chamber 11 is initially connected to exhaust, the membrane 14 will deflect downwards as the pressure in the lower chamber 11 falls below that in the intermediate chamber 12. The sheet material from which the inflatable boot is made is substantially inelastic and so the increase in volume of the intermediate chamber 12 resulting from deflection of membrane 14 downwards, is sufficient to produce a substantial drop in the pressure in chamber 12, even though there is no loss of air from the chamber. Similarly, the drop in pressure of chamber 12 is sufficient to permit the membrane 15 to deflect at least partially downwards, providing a drop in pressure for the upper chamber 13. Accordingly, connection of only the lower chamber 11 to exhaust at the end of the decompression cycle, may be sufficient to provide adequate reduction in pressure in all chambers of the garment. It will be appreciated that continued rotation of the rotary valve will in due course bring the exhaust ports 33 (FIG. 1) or 74 (FIG. 2) into registration with the other ports in the stator to connect chambers 12 and 13 to exhaust to allow further deflation before the next inflation cycle.

The selection of dimensions of the sensor sacs, or bladders 44, 45 and 46, may be done empirically to achieve the desired pressure ratios in the chambers of the boot. However, in the arrangement of FIG. 1, where only 1 sac or bladder is pressurized at any time, the squares of the diameters of the bladders will tend to be inversely proportional to the desired relative pressures of the associated chambers of the boot. In the arrangement of FIG. 2, on the other hand, where two or more bladders are at least partially inflated simultaneously, the dimensions of the bladders will not necessarily follow this rule.

Although embodiments of the invention have been described above in relation to controlling the inflation pressures of multichamber intermittent compression garments, the general principle of the multipressure relief valve can be applied in other applications where it is desired to achieve a plurality of controlled pressures one after the other, with the ratios of the pressures being substantially constant over a range of adjustable maximum pressures.

What is claimed is:

1. An inflatable compression garment in combination with a pressure control system for controlling the pressure in a plurality of separate fluid pressure chambers of said inflatable compression garment, comprising:

a vent having a valve seat;

a sealing member positioned for movement against and away from said valve seat to open and close said vent;

an actuating member connected to said sealing member for moving said sealing member between the opened and closed positions thereof;

biasing means coupled to said actuating member, to push said actuating member and said sealing member to said closed position;

a plurality of inflatable sacs, corresponding in number to the number of chambers in said inflatable compression garment, each of said plurality of inflatable sacs having a size different from each other sac wherein said size differences define a predetermined ratio, said sacs arranged so that when any one of said sacs is inflated, said inflated sac pushes against said actuating member in opposition to said biasing means to move said sealing member to its open position;

a sequentially operable valve having an input for being coupled to a fluid pressure source;

a plurality of conduits connected to provide communication between said garment chambers and said sequentially operable valve, and between said sacs and said sequentially operable valve, said valve being coupled to said vent to limit the fluid pressure applied by said valve through said conduits to said garment chambers when said sealing means is open, wherein said valve when sequentially operated causes sequential inflation of each garment chamber by flow through said conduits, and sequential inflation of each sac by flow through said conduits, and wherein the pressure to each chamber is limited at a different pressure than each other chamber and corresponds to said predetermined ratio when said sealing member opens said vent in response to inflation of its respective sac.

2. The pressure control system of claim 1 wherein only one of said plurality of inflatable sacs is inflated at any time.

3. The pressure control system of claim 1 wherein said flow through said conduits causes simultaneous inflation of more than one of said sacs.

4. The pressure control system of claim 1 wherein said sequentially operable valve comprises a rotary valve.

5. The pressure control system of claim 1 wherein said sequentially operable valve further comprises means to vent said plurality of conduits to the atmosphere for deflation of said inflatable compression garment.

6. The pressure control system of claim 1 wherein said plurality of inflatable sacs are formed in the shape of discs of varying radii.

7. The pressure control system of claim 1 wherein said inflatable compression garment comprises a fluid pressure chamber for enveloping a patient's foot, a fluid pressure chamber for enveloping said patient's ankle, and a fluid pressure chamber for enveloping said patient's calf.

8. The pressure control system of claim 7 further comprising a plurality of one-way valves connected between said fluid pressure chambers, so that fluid can flow from the calf chamber to the ankle chamber, and from the ankle chamber to the foot chamber when said foot chamber is deflated.

9. An inflatable compression garment in combination with a pressure control system for controlling the pressure in a plurality of separate fluid pressure chambers of said inflatable compression garment, comprising:

a vent having a valve seat;

a sealing member positioned for movement against and away from said valve seat to open and close said vent;

an actuating member connected to said sealing member for moving said sealing member between the opened and closed positions thereof;

biasing means coupled to said actuating member, to push said actuating member and said sealing member to said closed position;

a plurality of inflatable sacs, corresponding in number to the number of chambers in said inflatable compression garment, each of said plurality of inflatable sacs having a size different from each other sac, said sacs arranged so that when any one of said sacs is inflated, said inflated sac pushes against said actuating member in opposition to said biasing means to move said sealing member to its open position;

a sequentially operable valve having an input for being coupled to a fluid pressure source;

a plurality of conduits connected to provide communication between said garment chambers and said sequentially operable valve, and between said sacs and said sequentially operable valve, said valve being coupled to said vent to limit the fluid pressure applied by said valve through said conduits to said garment chambers when said sealing means is open, wherein said valve when sequentially operated causes sequential inflation of each garment chamber by flow through said conduits, and sequential inflation of each sac by flow through said conduits, and wherein the pressure to each chamber is limited at a different pressure than each other chamber when said sealing member opens said vent in response to inflation of its respective sac;

said inflatable compression garment comprising a fluid pressure chamber for enveloping a patient's foot, a fluid pressure chamber for enveloping said patient's ankle, and a fluid pressure chamber for enveloping said patient's calf.

10. The pressure control system of claim 9 further comprising a plurality of one-way valves connected between said fluid pressure chambers, so that fluid can flow from the calf chamber to the ankle chamber and from the ankle chamber to the foot chamber when said foot chamber is deflated.

11. A pressure control system for controlling the pressure in a plurality of separate fluid pressure chambers of an inflatable compression garment, comprising:

a vent having a valve seat;

a sealing member positioned for movement against and away from said valve seat to open and close said vent;

an actuating member connected to said sealing member for moving said sealing member between the opened and closed positions thereof;

biasing means coupled to said actuating member, to push said actuating member and said sealing member to said closed position;

a plurality of inflatable sacs, corresponding in number to the number of chambers in the inflatable compression garment, each of said plurality of inflatable sacs having a size different from each other sac wherein said size differences define a predetermined ratio, said sacs arranged so that when any one of said sacs is inflated, said inflated sac pushes against said actuating member in opposition to said biasing means to move said sealing member to its open position;

a sequentially operable valve having an input for being coupled to a fluid pressure source;

a plurality of conduits connected to provide communication between said sacs and said sequentially operable valve, and adapted for connection respectively to the separate garment chambers to provide communication between the garment chambers and said sequentially operable valve, said valve being coupled to said vent to limit the fluid pressure applied by said valve through said conduits when said sealing means is open, wherein said valve when sequentially operated causes sequential flow through said conduits, and sequential inflation of each sac by flow through said conduits, and wherein the pressure in each conduit is limited at a different pressure than each other conduit and corresponds to said predetermined ratio when said sealing member opens said vent in response to inflation of its respective sac.

12. The pressure control system of claim 11 wherein only one of said plurality of inflatable sacs is inflated at any time.

13. The pressure control system of claim 11 wherein said flow through said conduits causes simultaneous inflation of more than one of said sacs.

14. The pressure control system of claim 11 wherein said sequentially operable valve comprises a rotary valve.

15. The pressure control system of claim 11 wherein said sequentially operable valve further comprises means to vent said plurality of conduits to the atmosphere for deflation of said inflatable compression garment.

16. The pressure control system of claim 11 wherein said plurality of inflatable sacs are formed in the shape of discs of varying radii.

* * * * *